United States Patent [19]

Arndt et al.

[11] Patent Number: 4,494,244

[45] Date of Patent: Jan. 15, 1985

[54] STEP-OFF DEVICE FOR AIRCRAFT VOICE COMMUNICATION SYSTEM

[76] Inventors: Alfred Arndt, R.D. 4 Box 346; John G. Rutty, R.D. 5, Box 292, both of Hanover, Pa. 17331

[21] Appl. No.: 466,318

[22] Filed: Feb. 14, 1983

[51] Int. Cl.³ .............................................. H04B 1/44
[52] U.S. Cl. ........................................ 455/78; 455/58
[58] Field of Search ..................... 455/78, 79, 83, 89, 455/54, 58

[56] References Cited

U.S. PATENT DOCUMENTS

| | | |
|---|---|---|
| 1,612,448 | 12/1926 | Latour . |
| 2,469,555 | 5/1949 | Hitchcock ............................. 455/79 |
| 2,577,751 | 12/1951 | Halstead . |
| 2,662,974 | 12/1953 | Dorff . |
| 2,691,723 | 10/1954 | Nordahl . |
| 2,731,622 | 1/1956 | Doremus et al. . |
| 2,731,635 | 1/1956 | Walker . |
| 2,858,420 | 10/1958 | Lutz . |
| 2,877,343 | 3/1959 | Mitchell ............................... 455/58 |
| 2,932,729 | 4/1960 | Yamato et al. . |
| 3,938,156 | 2/1976 | Lunden . |
| 4,013,959 | 3/1977 | Patterson . |
| 4,085,365 | 4/1978 | Reick .................................. 455/78 |
| 4,156,193 | 5/1979 | Baker .................................. 455/76 |
| 4,199,661 | 4/1980 | White et al. . |
| 4,259,663 | 3/1981 | Gable . |
| 4,366,578 | 12/1982 | Foster et al. ........................ 455/79 |

OTHER PUBLICATIONS

Nigel M. Corrigan, "Simultaneous Transmissions Can Be Avoided", Letter Published in *Flight International*, Jan. 3, 1981, p. 32.

*Primary Examiner*—Marc E. Bookbinder
*Attorney, Agent, or Firm*—Kerkam, Stowell, Kondracki & Clarke

[57] ABSTRACT

Systems for preventing the operator of an aircraft radio from beginning a transmission while someone else is transmitting on the same radio frequency channel, which is known as "stepping on" the first transmission. In one form, a "step-off" device in accordance with the invention is internally connected to the radio receiver circuitry to sense when a particular selected radio frequency channel is in use. An SCR is interposed in series with the transmitter push-to-talk (PTT) line, and the SCR is gated into conduction only when the selected radio frequency channel is not in use. In another form, a step-off device is retrofitted externally to a aircraft radio, without requiring any modification whatsoever to the basic radio. Operating power for the step-off device is derived from the PTT circuit.

8 Claims, 3 Drawing Figures

STEP-OFF DEVICE FOR AIRCRAFT VOICE COMMUNICATION SYSTEM

BACKGROUND OF THE INVENTION

The present invention relates generally to aircraft voice communication radios such as are normally employed in two-way communication with air traffic control facilities. More particularly, the invention relates to means for preventing interference of the type which arises when two or more radios are transmitting on the same channel frequency.

Two-way voice communications between aircraft and groud-based air traffic control facilities are generally carried out by means of VHF communications transceivers, customarily termed "COM" radios. Typically, COM radios employ amplitude modulation (AM) and operate in a frequency band from 118.0 MHz to 135.95 MHz on any of a plurality of selectable discrete channel frequencies, e.g., on any one of 360 defined channels, with a 0.05 MHz channel spacing.

At each radio location, whether within an aircraft or at an air traffic control facility, there is a manually-operable push-to-talk (PTT) switch for activating the transmitter circuitry and de-activating the receiver circuitry. Thus the normal or stand-by mode is the receiver mode. In the case of a hand-held microphone, the PTT switch is normally included within a microphone housing including both a microphone element and the PTT switch. A microphone cord includes both audio and PTT control conductors, and terminates in a suitable microphone plug. In other cases, a so-called boom microphone element is attached to a headset assembly, and the push-to-talk switch is located elsewhere, for example, on the aircraft control yoke. In either case, the transmitter circuitry can be activated any time at the discretion of the radio operator, such as the aircraft pilot.

Proper radio operating technique is to always listen before transmitting on a particular channel frequency, in order to ensure that the particular channel frequency is not already in use. However, in practice, proper technique is not always followed, and occasionally pilots transmit on a channel frequency at the same time someone else, either another aircraft or a ground facility, is transmitting on the same channel. This is known as "stepping on" the other transmission. The consequence of stepping on a transmission in many cases is that neither transmission is intelligible at the receiving station. Thus, the particular radio frequency channel is temporarily rendered useless. This is particularly so since amplitude modulation (AM) is employed in the type of aircraft communications radio here concerned, rather than frequency modulation (FM). FM communications systems exhibit a "capture effect" whereby the strongest signal presented to a receiver is heard clearly, to the complete exclusion of other, weaker transmissions. However, in AM communication systems, all transmissions on a particular channel frequency are heard in the receiver causing mutual interference. Moreover, since the actual carrier frequencies of several transmitters nominally on the same channel frequency are rarely in fact identical, but rather can differ by up to several kHz, hetrodynes or beat notes in the form of one or more squeals are normally heard in an AM receiver when more than one transmitter is on the same channel frequency, increasing the effect mutual interference.

In many two-way communication systems, one transmission "stepping on" another may be no more than a minor annoyance. However, in the context of an aircraft communication system, one transmission 37 stepping on" another is potentially hazardous. This is particularly so because, in busy air traffic control situations, a controller may be communicating in rapid sequence with a number of aircraft employing brief messages and terse phraseology to maximize the amount of information which can be communicated in short period of time. At aircraft speeds, situations develop rapidly, and it is important that aircraft communications proceed in a smooth fashion. The potentially hazardous consequences of a missed communication during a critical phase of flight will be well appreciated.

In the field of radio communication in general, a variety of approaches have been employed for avoiding mutual interference between multiple radio transmitters. For example, automatic contention-resolving systems for use where a number of communication units share a common channel or radio frequency are disclosed in the following U.S. Patents: Doremus et al U.S. Pat. No. 2,731,622; Walker U.S. Pat. No. 2,731,635; Patterson U.S. Pat. No. 4,013,959; White et al U.S. Pat. No. 4,199,661; and Gable U.S. Pat. No. 4,259,663. Similar systems have also been employed in operator-controlled communication systems, such as are disclosed in the following representative U.S. Patents: Latour U.S. Pat. No. 1,612,448; Halstead U.S. Pat. No. 2,577,751; Dorff U.S. Pat. No. 2,662,974; Nordahl U.S. Pat. No. 2,691,723; Lutz U.S. Pat. No. 2,858,420; Yamato et al U.S. Pat. No. 2,932,729; and Lunden U.S. Pat. No. 3,938,156. Considering, for example, the Dorff U.S. Pat. No. 2,662,974 in greater detail, the Dorff patent discloses a technique for preventing mutual RF interference between a number transmitters operating on the same frequency, by selectively inhibiting transmission when the channel is sensed to be in use. In the Dorff system, a monitor receiver, tuned to the transmission frequency, senses the presence of any RF carrier and either inhibits or enabled keying of the transmitter at its location through several interactive relays.

SUMMARY OF THE INVENTION

It is an overall object of the invention to provide systems for preventing the operator of an aircraft radio from beginning a transmission while someone else is transmitting on the same channel, i.e., from preventing the radio operator from "stepping on" a transmission already in progress. The subject device to prevent this occurrence accordingly is, for convenience, termed a "step-off" device.

It is another object of the invention to provide such devices particularly adapted to be used in combination with aircraft communication radios.

While step-off devices in accordance with the invention can readily be included in newly-manufactured aircraft radios as an integral part of their circuitry, it is another object of the invention to provide a step-off device which can readily be externally connected to an aircraft radio to provide the required function without any modification whatsoever to the basic radio.

It is yet another object of the invention to provide a compact, external step-off device which derives its operating power from the aircraft radio to which it is connected.

It is a further object of the invention to provide an external step off device which derives its operating power from the radio to which it is connected, and which is operable, without modification or adjustment, from a relatively wide range of supply voltages, e.g. from +12 to +28 volts, as are found in various specific radio models.

Briefly, and in broad concept, a step-off device is appropriately connected to the receiver circuitry of the aircraft communication radio to sense when a selected radio frequency channel is in use. When the selected channel is used, operation of the associated transmitter circuitry is inhibited even though the push-to-talk switch is operated.

The step-off device more particularly comprises sensing means connected to the receiver circuitry for sensing when a particular selected radio frequency channel is in use, and transmitter-disabling means connected to the sensing means and to transmitter circuitry of the aircraft communication radio for preventing activation of the transmitter circuitry by the push-to-talk switch when the particular selected radio frequency channel is in use.

In one specific form, the sensing means is connected within the receiver circuitry to a circuit mode having applied thereto a voltage level which varies depending upon whether a signal is being received on the particular selected radio frequency channel. The sensing means is operable to determine when the applied voltage level crosses a predetermined threshold. As one example, the circuit mode may have applied thereto receiver automatic gain control voltage. As another example, the circuit node may have applied thereto receiver squelch control voltage which exists in the receiver in any event to mute the audio output when no signal is being received. In either event, such circuitry in accordance with the invention may readily be incorporated, at minimal additional cost, into newly-manufactured aircraft radios.

In another general form of the invention, which may readily be externally retrofitted to existing aircraft communication radios without modification or redesign of the basic radio, the sensing means is connected to an audio output of the receiver circuitry, and is operable to determine when audio output level exceeds a predetermined threshold.

In one particular embodiment, a step-off device in accordance with the invention is intended for retrofit connection to an aircraft voice communication radio of the general type summarized above and including ground connection-activated push-to-talk circuitry for manually activating the transmitter circuitry and de-activating the receiver circuitry when a ground return connection is completed through the push-to-talk switch included, for example, in the microphone housing. As is known, such push-to-talk circuitry typically includes a voltage supply line providing a supply voltage (e.g. +28 volts) with respect to a circuit reference node (e.g. ground). Such circuitry also includes a controlled switching element, such as a relay having an output portion (e.g. relay contacts) operably connected for selectively activating the transmitter circuitry and de-activating the receiver circuitry and having a control input portion (e.g. an electromagnetic relay coil) with a pair of input terminals for activating the output portion when at least a predetermined input current level flows through the coil between the input terminals. The voltage supply line is connected to one of the pair of switching element input terminals, and a push-to-talk control terminal is connected to the other of the pair of switching element control terminals and arranged for connection to a manually-operable push-to-talk switch for completing a series electrical circuit to the circuit reference node. Thus, when the push-to-talk switch is actuated, a ground return circuit is completed, energizing the relay coil, and causing the relay contacts to switch to the transmit position.

Such a radio normally has a microphone receptacle for receiving a microphone cord having conductors both for the microphone audio circuit and for the PTT line, and terminating in a plug. The microphone receptacle may be located either on the radio itself, or on a panel of the aircraft. In accordance with the invention, a relatively compact device is externally interposed in series between the microphone plug and the radio receptacle. Thus, the subject step-off device plugs into the radio microphone receptacle, and the microphone cord in turn plugs into the step-off device. A separate receiver audio sense line plugs into the receiver audio output, for example, through a "Y" connector, which then also provides an output for the headphones.

Advantageously, the step-off device of the invention derives its operating power from the push-to-talk circuit, thus requiring no modification to either the radio receiver wiring or the aircraft electrical system which otherwise might be required for the purpose of deriving operating power for the step-off device, nor are batteries required which would necessitate frequent replacement to maintain proper operation. Moreover, the device is not at all critical insofar as the precise supply voltage is concerned, and operates properly over at least a range of from +12 volts to +28 volts.

More particularly, the step-off device includes a thyristor having a pair of main terminals and a gate terminal for triggering conduction between the main terminals. The thyristor main terminals are electrically interposed in series between the push-to-talk control terminal of the radio and the push-to-talk switch of the microphone such that the transmitter circuitry can be activated only when the thyristor is conducting.

The subject step-off device additionally includes a triggering circuit having an input connected to sense received audio signal level and an output connected to the thyristor gate terminal. The triggering circuit is operable to supply a gating signal to the thyristor gate terminal only when the received audio signal level is below a predetermined threshold level. When the received audio signal level is above the predetermined threshold level, indicating the particular selected channel is in use, the thyristor is not gated, and the transmitter circuitry can therefore not be operated even though the push-to-talk control switch is operated.

Finally, the step-off device includes a power supply circuit for supplying operating voltage to the triggering circuit. The power supply circuit indirectly derives voltage from the voltage supply line within the aircraft radio by means of a connection to the push-to-talk control terminal. Thus, during those periods of operation when the PTT relay is not actuated, voltage from the voltage supply line is available through the relay coil. The power supply circuit additionally includes a series-connected current-limiting impedance for limiting current through the power supply circuit to a level below the predetermined input current level of the PTT relay. In other words, a relatively small current is drawn by the power supply circuit, insufficient to actuate the PTT relay.

Significantly, the step-off device circuitry of the invention successfully addresses a number of considerations and problems which arise due to the nature of the device as a retrofit device involving absolutely no internal connection to the aircraft radio circuitry. Three of these considerations are summarized below.

First, the step-off device must not be adversely affected by "sidetone" audio during periods of transmission. As is known, during periods of transmission the radio receiver circuitry is disabled and the audio output generally muted since the transmitter and receiver are operating on the same frequency. However, so that audio being transmitted can also be monitored through any headsets plugged into the receiver circuitry, audio from the speech amplifier stages of the transmitter is frequently injected into the receiver audio output stages to be heard in the headsets as a sidetone. It is important that the step-off device of the present invention not be influenced by this sidetone audio and erroneously interpret the sidetone audio as a received signal indicating that the transmitter should be disabled. In accordance with the invention, this particular problem is overcome by the selection of a thyristor as the transmitter-disabling element in series with the push-to-talk switch, as well as by the manner in which the retrofit step-off device is powered. As is known, a thyristor is a semiconductor switching device which, once triggered into conduction by the application of a suitable gate voltage, remains conducting, even though gate voltage is subsequently removed, so long as sufficient current (above a holding current rating of a particular device) continues to flow through the thyristor. It will be appreciated that thyristor is a relatively generic term. A specific form of thyristor particularly suitable for use in the step-off device of the present invention is known as a silicon-controlled rectifier (SCR), although there are other forms of thyristors which may also be employed. Thus, once the SCR is triggered into conduction and the push-to-talk switch is actuated, current begins to flow through the SCR, which remains conducting, even through the sidetone audio influences the triggering circuit, causing the SCR to no longer be gated.

Second, the step-off device of the invention must remain operable even though operating voltage for the step-off device is not available during periods of transmission. In other words, a transmission must not be prematurely cut off because power is not being supplied to the triggering circuit of the step-off device during periods of transmission. More particularly, the power supply circuit in effect "steals" operating voltage from the PTT circuit, and this operating voltage is not available when the PTT switch is actuated and the SCR is conducting. The step-off device circuit of the present invention overcomes this particular problem again through choice of an SCR as the disabling element interposed in series with the PTT line. For the same reasons as discussed just above in the context of audio side tone during periods of transmission, once the SCR is triggered into conduction it remains conducting, even though the triggering circuit is no longer operating.

Third, the current drain of the step-off device must be sufficiently low so as to avoid erroneously actuating the radio PTT circuitry. This is accomplished through the use of an inherently low-current drain circuit and, again, through the use of a thyristor as the transmitter-disabling element. The thyristor requires only a minimal gate current to be triggered into conduction, and consumes no current in the receive mode.

In one form, the triggering circuit of the invention comprises a rectifier and low pass filter circuit for providing at an output a DC voltage level representative of the received audio signal level at the triggering circuit input. The triggering circuit additionally includes a reference voltage source and a voltage comparator having a comparison input connected to the output of the rectifier low pass filter circuit and a reference input connected to the reference voltage source. The comparator has an output serving as the triggering circuit output and is connected to the thyristor gate terminal. Preferably, the triggering circuit additionally includes an audio amplifier having input connected to the triggering circuit input and an output connected to the rectifier and low pass filter circuit.

BRIEF DESCRIPTION OF THE DRAWINGS

While the novel features of the invention are set forth with particularity in the appended claims, the invention, both as to organization and content, will be better understood and appreciated from the following detailed description, taken in conjunction with the drawings, in which:

DESCRIPTION OF THE PREFERRED EMBODIMENTS

Figure 1:
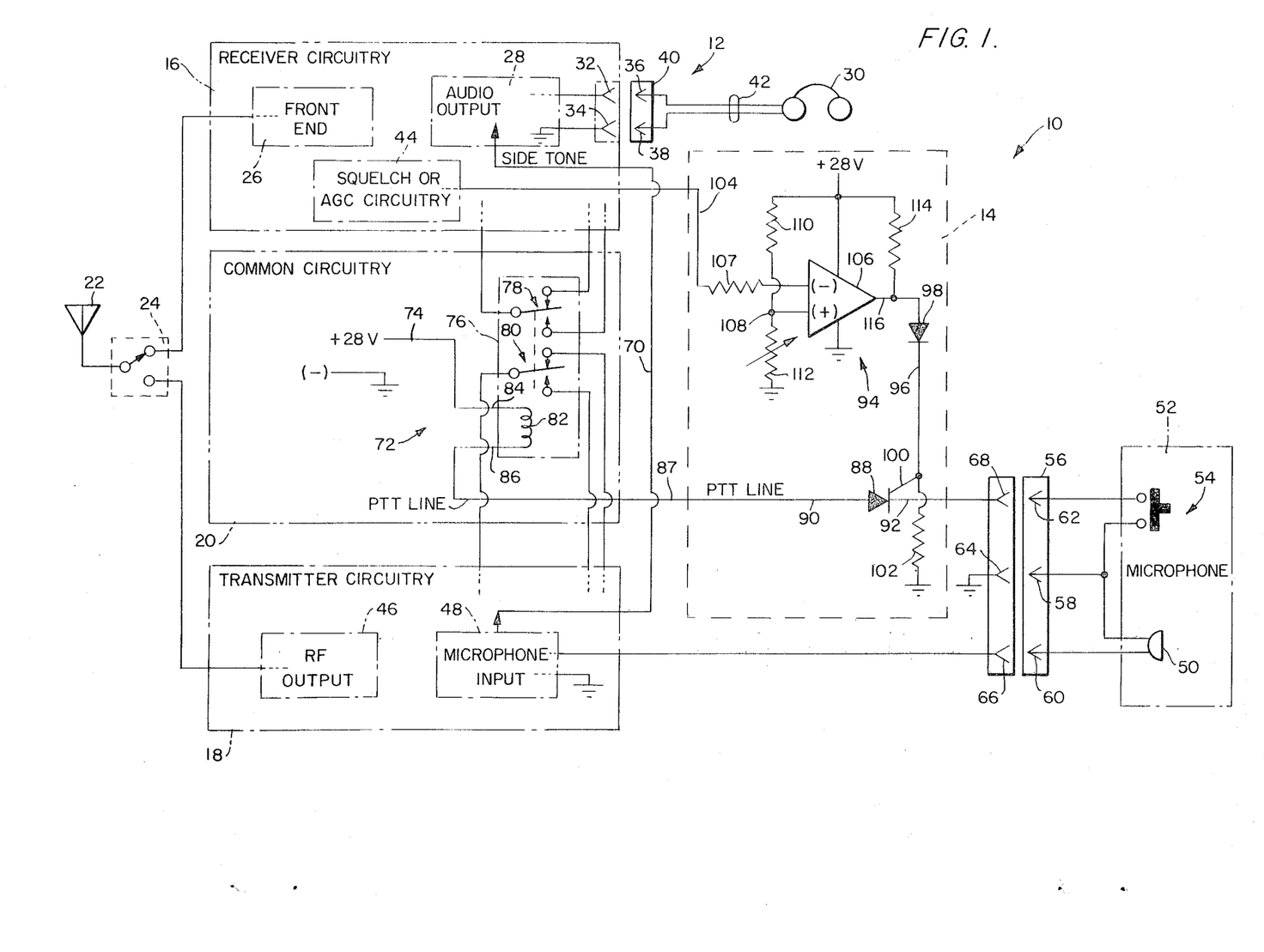
FIG. 1 is a schematic depiction, partly in block diagram form, of an aircraft voice communication radio including a step-off device in accordance with the invention internally connected to the receiver circuitry of the overall radio.

Referring first to FIG. 1, shown in an overall combination 10 is an aircraft voice communication radio 12 of generally conventional type combined with a step-off device, generally designated 14, in accordance with the present invention.

The aircraft voice communication radio 12 more particularly includes radio receiver circuitry 16 and radio transmitter circuitry 18 selectively operable on any one of a plurality of radio frequency channels, for example, in the 118.0 MHz to 135.95 MHz frequency band. Closely associated with the receiver 16 and transmitter 18 circuitry is circuitry 20 common to both the receiver 16 and transmitter 18 circuitry and including such common elements as a power supply (not specifically shown) and common control circuitry such as transmit/receive changeover circuitry. The receiver 16 and transmitter 18 circuitry share a common antenna 22, which is switched between the receiver 16 and transmitter 18 circuitry by means of a transmit/receive switch 24, which may comprise either an electromechanical relay or a solid-state transmit/receive switch depending upon the design of the specific receiver 16, transmitter 18 and common control 20 circuitry.

It will be appreciated that the elements in FIG. 1, as thus far described, comprise general elements of an aircraft voice communication radio such as are available from various manufacturers. A feature of the present invention is that it may be used in combination with virtually any existing aircraft voice communication radio. Accordingly, the present invention is not directed specifically to the receiver 16, transmitter 18 and common circuitry 20. Rather, these circuits comprise the environment within which the present invention is employed.

Typically, the receiver circuitry 16 includes various front end stages 26, connected to the antenna 22 through the transmit/receive switch 24. The receiver circuitry 16 also includes an audio output stage 28 connected to a headset 30 through a pair of connector terminals 32 and 34 which mate with a pair of corresponding connector terminals 36 and 38 carried by a plug 40 at the end of a headset cord 42.

The receiver circuitry 16 additionally includes a box designated 44 and indicated as including squelch or automatic gain control (AGC) circuitry. Typical receivers in aircraft include both AGC and squelch, and the presence of the box 44 thus labeled indicates that the step-off device of the present invention may be connected to either the squelch or the AGC circuitry.

As is known, AGC circuits are generally included in all radio receiver circuits, and squelch circuitry is included in generally all radio receiver circuits for channelized communication. Both are generally responsive to received signal level. The function of the AGC circuitry is to adjust the gain of the receiver circuitry, such as the gain of the front end 26, such that all received signals are presented to the headset 30 at approximately the same amplitude, regardless of the received signal strength. Generally included in AGC circuitry is a particular circuit node or conductor termed on AGC line which carries a voltage representative of received signal strength. The function of squelch circuitry is to mute the receiver audio output during periods when no received signal is present in order to avoid undue noise in the headset 30. In AM receivers the squelch control voltage is typically derived from the AGC circuit, and thus is carrier-responsive. The output of the squelch circuitry is typically a switching signal voltage which abruptly changes from one voltage to another when the receiver is to be muted and vice-versa.

It will be appreciated that the receiver circuitry 16 includes numerous conventional elements in addition to the front end 26, audio output 28, and squelch or AGC circuitry, for example, intermediate frequency stages and detector circuitry.

The transmitter circuitry 18 includes an RF output stage 46 also connected to the antenna 22 through the transmit/receive circuitry 24. Included in the tranmitter circuitry 18 is a microphone input stage 48, typically comprising an audio amplifier. The function of the microphone input stage 48 is to amplify the low-level audio output from a microphone element 50 included within a hand-held microphone housing 52, which also includes a push-to-talk (PTT) switch 54. A microphone plug 56 includes a circuit reference (ground) connector terminal 58, a microphone audio circuit connector terminal 60 and a push-to-talk circuit connector terminal 62 mating with corresponding connector terminals 64, 66, and 68, respectively, comprising a microphone receptacle.

It will be appreciated that the tranmitter circuitry 18 also includes numerous conventional elements in addition to the RF output stage 46 and the microphone input stage 48, for example, frequency-determining circuitry and modulation circuitry.

To provide a sidetone signal during periods of transmitting, a line 70 is connected from the microphone input circuitry of the transmitter 18 to the audio output circuitry 28 of the receiver circuitry 16.

The final relatively conventional element in FIG. 1 is the common circuitry 20. While the common circuitry 20 may include a number of elements depending upon the particular radio, for present purposes it is sufficient to note that the common circuitry 20 includes ground connection-activated push-to-talk (PTT) circuitry 72 for manually activating the transmitter circuitry 18 and de-activating the receiver circuitry 16 when the microphone PTT switch 54 is operated. More particularly, there is a voltage supply line 74 supplied from a suitable source of power, such as the aircraft electrical system. While the voltage supply line 74 is designated in FIG. 1 as having +28 volts applied thereto, it will be appreciated that this voltage is exemplary only, and that different voltages are employed in different aircraft and aircraft radios. For example, the electrical systems of many general aviation aircraft and radios operate from +12 volts. It is a feature of the subject invention that it may be employed regardless of the particular supply voltage.

Also included in the common circuitry is a controlled switching element in the form of a PTT relay 76 having an output portion in the form of contacts 78 and 80 operably connected for selectively activating the transmitter circuitry 18 and de-activating the receiver circuitry 16, and having a control input portion in the form of coil 82 with a pair of input terminals 84 and 86 for activating the output portion 78 and 80 when at least a predetermined input level flows through the coil 82 between the input terminals 84 and 86. In FIG. 1, connections from the contacts 78 are shown in highly generalized fashion extending into the receiver circuitry 16 and the connections from the contacts 80 are shown extending in highly generalized fashion into the transmitter circuitry 18 in order to appropriately effect changeover from receive mode to transmit mode and vice-versa. The specific connections are not shown inasmuch as these are dependent upon the particular receiver and transmitter circuitry, to which the present invention is not specifically directed.

The exemplary +28 volt supply line 74 is connected to one 84 of the coil 82 terminals, and the other 86 of the coil terminals 82 is arranged for connection via a PTT line 87 to the PTT switch 54 for completing a series electrical circuit to circuit ground. Thus, when the PTT line 87 is grounded, the relay coil 82 is energized, switching the relay 76 from receive mode to transmit mode.

In FIG. 1, the form of step-off device 14 in accordance with the invention comprises a thyristor in the form of an SCR 88 having anode and cathode main terminals 90 and 92 electrically interposed in series between the PTT line 87 and the PTT switch 54 such that the transmitter circuitry 18 can be activated only when the SCR 88 is conducting.

The FIG. 1 step-off device 14 includes a comparator-based triggering circuit, generally designated 94, having an output 96 in series with an isolation diode 98 and connected to the gate terminal 100 of the SCR 88. To avoid false triggering due to noise, a resistor 102 is connected between the SCR 88 gate 100 and circuit ground.

The triggering circuit 94 has an input 104 connected within the receiver circuitry 16 to a circuit node having applied thereto a voltage level which varies depending upon whether a signal is being received on the particular selected radio frequency channel. As depicted in FIG. 1, this circuit node may be within either the squelch or AGC circuitry, designated collectively as 44.

In the particular circuit illustrated, an integrated circuit comparator 106 has an inverting (−) input which serves as a comparison input, and the triggering circuit input 104 is connected through a current-limiting resistor 107 to the comparator 106 inverting (−) input. The comparator 106 non-inverting (+) input serves as the reference input, and is connected to the tap point 108 of a voltage divider comprising a fixed resistor 110 and a variable resistor 112, the variable resistor 112 serving to adjust the threshold of the comparator 106. In addition to the diode 98, a pull-up resistor 114 is connected to the comparator 106 output 116.

These particular comparator connections are determined by the nature of the squelch or AGC circuitry 44 to which the line 104 is connected. In this particular embodiment, the squelch or AGC circuitry 44 voltage increases in a positive sense as received signal strength increases.

Considering the operation of the circuit of FIG. 1, it will first be assumed that the particular channel to which the transmitter 18 and receiver 16 are tuned is clear of any transmission. Under such conditions, the triggering circuit input 104 connected to the squelch or AGC circuitry 44 is at a relatively low voltage level, less than the reference voltage on the tap point 108 connected to the comparator 106 non-inverting (+) input. With the comparator 106 inverting (−) input at a lower voltage than the non-inverting (+) input, the comparator 106 output 116 is high, gating the SCR 88 through the isolation diode 98. With the SCR 88 gated, at any time the microphone 52 PTT switch 54 is operated, a series ground return path is completed through the SCR 88, energizing the relay coil 82 and operating the PTT relay 76, to place the transmitter 18 in the transmit mode and a receiver 16 in the receive mode. Once the SCR 88 is triggered into conduction, it remains conducting so long as the microphone PTT switch 54 is operated since an SCR inherently latches into conduction so long as its holding current rating is exceeded. Thus, once begun, a transmission is not prematurely terminated regardless of what happens at the output of the squelch or AGC circuitry 44.

Considering the opposite case, again in the receive mode, when the particular channel to which the receiver 16 and transmitter 18 are tuned is in use, the voltage on the input line 104 applied to the comparator 106 inverting (−) input is higher than the reference voltage applied to the comparator 106 non-inverting (+) input. The comparator 106 output 116 therefore goes low, removing the gating signal to the SCR 88. Thus, even though the mirophone 52 PTT switch 54 is operated, the series circuit for energizing the PTT relay coil 82 cannot be completed. However, as soon as the channel frequency is again clear, the voltage on the line 104 again decreases, and the comparator 106 output again goes high, again gating the SCR 88.

Figure 2:
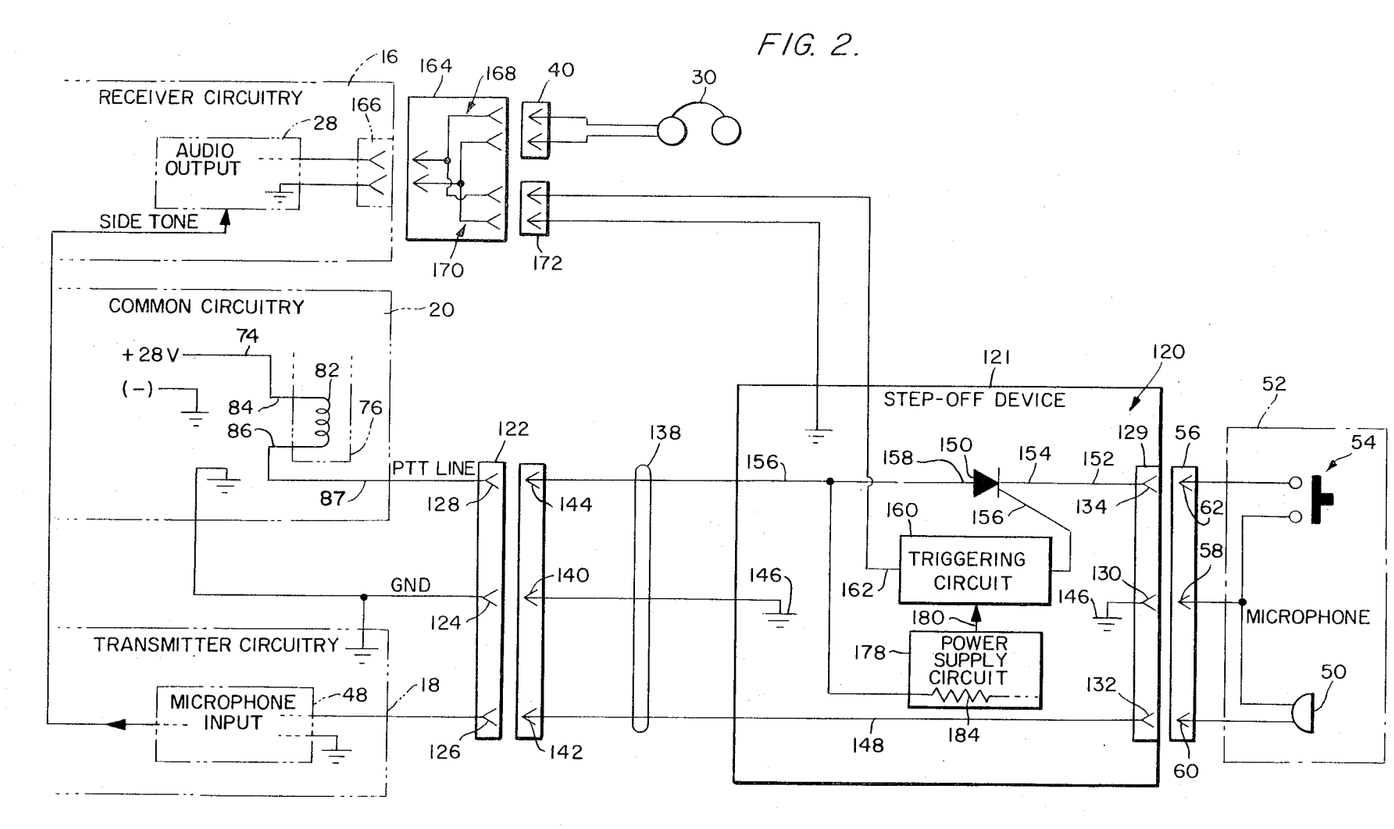
FIG. 2 is an electrical schematic depiction in block diagram form of an aircraft voice communication radio including a step-off device in accordance with the invention connected to an audio output of the receiver circuitry.

Referring now to FIG. 2, shown in block diagram form is another embodiment of a step-off device 120 in accordance with the invention, particularly adapted for retrofit connection to an existing aircraft radio without any modification whatsoever to the basic radio, and having a separate enclosure 121. Accordingly, the receiver circuitry 16, the transmitter circuitry 18 and the common circuitry 20 are essentially identical to these same elements as described above with reference to FIG. 1. In FIG. 2, the basic radio includes a microphone circuit receptacle 122 originally intended for receiving the microphone circuit plug 56. Accordingly, the microphone circuit receptacle 122 includes a circuit reference (GND) connector terminal 124, a microphone audio circuit connector terminal 126, and a PTT circuit connector 128. Again, the +28 volt supply voltage is exemplary.

In general, the step-off device 120 is intended to be simply interposed in series between the microphone plug 56 and the microphone circuit receptacle 122. Accordingly, to receive the microphone plug 56, a microphone receptacle 129 is carried by the enclosure 121 and adapted to receive the plug 56. The receptacle 129 includes appropriate connector terminals, i.e., a circuit reference connector terminal 130, and microphone audio circuit connector terminal 132 and a PTT circuit connector terminal 134. Also attached to the enclosure 121 is a microphone circuit plug 136. The microphone circuit plug 136 may either be attached directly to the enclosure 121, or may be at the distal end of a suitable flexible multi-conductor cord 138. In either event, the microphone circuit plug 136 has a circuit reference connector terminal 140, a microphone audio circuit connector terminal 142 and a PTT circuit connector terminal 144.

Within the step-off device 120 enclosure 121, a ground electrical connection is completed between the circuit reference connector terminal 130 of the microphone receptacle 128 and the circuit reference connector terminal 140 of the microphone circuit plug 136. As indicated, this is accomplished by means of a common ground connection, depicted schematically at 146. Audio from the microphone element 50 is passed directly through the step-off device 120. Accordingly, a conductor 148 directly electrically connects the microphone audio circuit connector terminal 132 of the microphone receptacle 128 to the microphone audio circuit connector 142 of the microphone circuit plug 136.

In FIG. 2, as in FIG. 1, the transmitter-disabling element comprises a thyristor in the form of an SCR 150 interposed in series between the PTT line 87 and the PTT switch 54. In particular, a conductor 152 electrically connects the PTT circuit connector terminal 134 of the microphone receptacle 128 and the SCR cathode terminal 154, and another conductor 156 electrically connects the PTT circuit connector terminal 144 of the microphone circuit plug 136 to the thyristor anode terminal 158. It will be appreciated therefore that the relay coil 82 and thus the transmitter circuitry 18 can be activated only when the SCR 150 is conducting.

In order to appropriately gate the SCR 150, also included within the step-off device 120 is a triggering circuit 160 having an input 162 connected to sense the received audio signal. Preferably, this is accomplished by means of a dual plug "Y" adaptor shown schematically at 164 which plugs directly into a headphone circuit jack 166 of the receiver circuitry 16. The dual plug "Y" adaptor 164 includes an output jack 168 for receiving the headset 30 plug 40, and another jack 170, electrically in parallel with the jack 168, for receiving a plug 172 facilitating electrical connection of the triggering circuit 160 input 162 to the receiver audio output 28.

The triggering circuit 160 has an output 174 connected to the gate terminal 176 of the SCR 150 and is operable to supply a gating signal to the gate terminal 176 only when the received audio signal level is below a predetermined threshold level.

The final element included within the step-off device 120 is a power supply circuit 178 for supplying operating voltage via a line 180 to the triggering circuit 160. The power supply circuit 178 includes a connection 182 to the PTT line 87 for indirectly deriving voltage from the exemplary +28 volt voltage supply line 74 through the relay coil 82 during those periods of operation when the PTT relay 76 is not actuated. In order to limit current through the power supply circuit 178 to a level below the predetermined input current level of the relay 76 at which the relay 76 is actuated, a current limiting impedance, shown as a resistor 184, is included in the power supply circuit 178.

It will be appreciated that the step-off device 120 of FIG. 2 derives its operating voltage from the aircraft radio itself, whatever that operating voltage may be, and requires no internal connections to the radio circuitry. The step-off device 120 is connected to the aircraft radio solely through connectors normally available in any event.

During operation, when receiver audio output level as sensed by the triggering circuit 160 is below the predetermined threshold, indicating that the selected radio frequency channel is not in use, the SCR 150 is gated, and the series circuit connecting the PTT line 88 to circuit ground can be completed whenever the microphone 52 PTT switch 54 is actuated. Once the SCR 150 begins conducting, it remains conducting even though it is no longer gated, as will be the case as, initially, sidetone audio output causes the triggering circuit 160 to remove the SCR gating signal and, then, the power supply circuit 178 no longer supplies power to the triggering circuit 160 because the PTT line 88 is nearly at ground potential.

On the other hand, during receive mode when the triggering circuit 160 senses an audio output level indicating that the particular radio frequency channel to which the receiver circuitry 16 is tuned is in use, then the triggering circuit 160 removes the gating signal from the SCR 150, and the PTT line 88 cannot be grounded through the SCR 150, even though the PTT switch 54 is operated.

Figure 3:
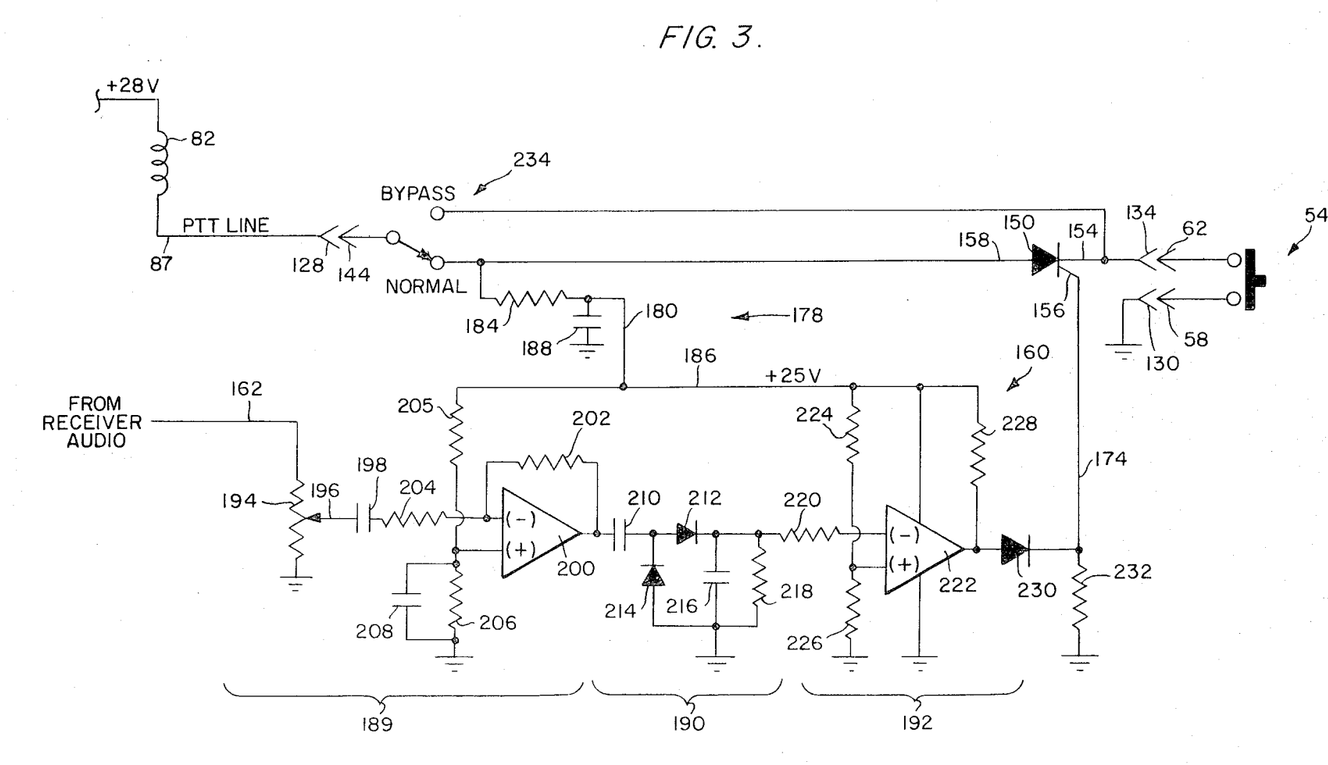
FIG. 3 is a detailed electrical schematic diagram of the inventive step-off device of FIG. 2.

Referring finally to FIG. 3, FIG. 3 is a detailed electrical schematic diagram of a suitable triggering circuit 160 and a power supply circuit 178 for use in the step-off device 120 of FIG. 2. As mentioned above, advantageously the specific circuitry of FIG. 3 is operable, without modification or adjustment, over a relatively wide range of supply voltages, at least over a range of from +12 to +28 volts. Thus, the external form of step-off device is useful in a wide variety of aircraft, from small general aviation aircraft to large commercial transport aircraft.

In FIG. 3, the power supply circuit 178 comprises simply the series resistor 184 connected to supply a +V line 186, and a filter capacitor 188. For purposes of example, the +V line 186 is shown as having +25 volts applied thereto.

The triggering circuit 160 comprises, in series, an audio amplifier generally designated 189, a rectifier and low pass filter circuit generally designated 190, and a voltage comparator circuit generally designated 192. The input of the audio amplifier 189 is connected to the triggering circuit input 162, and the voltage comparator 192 output is connected to and comprises the triggering circuit output 174 connected to the thyristor 150 gate terminal 176.

In detail, the audio amplifier 189 includes an input potentiometer 194 which serves as a sensitivity control. The wiper terminal 196 of the potentiometer 194 is connected through a coupling capacitor 198 to an operational amplifier 200. One-half of a National Semiconductor Type No. LM392 integrated circuit operational amplifier is suitable for the operational amplifier 200. In order to establish a voltage gain of one hundred, a 1.5 megohm negative feedback resistor 202 is connected between the operational amplifier 200 output and the inverting (−) input, and a 15K ohm series input resistor 204 is connected between the coupling capacitor 198 and the operational amplifier 200 inverting (−) input. The operational amplifier 200 non-inverting (+) input is biased at one-half the supply voltage on the +V line 186 by means of equal-valued series-connected voltage divider resistors 205 and 206. A de-coupling capacitor 208 is also connected to the comparator 200 non-inverting (+) input.

The audio amplifier 189 output is connected via a coupling capacitor 210 to the rectifier and low pass filter circuit 190. In particular, the rectifier and low pass filter circuit comprises a pair of diodes 212 and 214 connected in fullwave rectifier configuration, and an integrating and filter capacitor 216 connected to circuit ground. A resistor 218 in parallel with the capacitor 216 establishes a discharge time constant of approximately 0.15 seconds.

The rectifier and filter circuit 190 output is connected through a current-limiting resistor 220 to the inverting (−) input of an integrated circuit comparator 222 within the overall comparator circuit 192. Preferably, the integrated circuit comparator 222 comprises the other half of the LM392 amplifier. The other input of the comparator 222, i.e. the non-inverting (+) input, serves as the reference input, and is connected to a reference voltage divider comprising series-connected resistors 224 and 226, which maintain approximately 2.5 volts at the non-inverting (+) input when the triggering circuit 160 is powered (assuming operation from an exemplary +28 volt supply).

A pull-up resistor 228 is connected to the comparator 222 output, and an isolation diode 230 is connected in series between the comparator 222 output and the SCR 150 gate terminal 176. Finally, to prevent false triggering, a resistor 232 is connected between the SCR 150 gate terminal 176 and circuit ground.

Considering the operation of FIG. 3, assuming first that the particular selected radio frequency channel is not in use, then a relatively low audio level is received at the input 162 and amplified by the amplifier 189. The output of the rectifier and low pass filter circuit 190 is relatively low, lower than the 2.5 volt reference voltage at the comparator 222 non-inverting (+) input. Accordingly, the comparator 222 output is high, gating the SCR 150. Accordingly, whenever the PTT switch 54 is actuated, the PTT line 88 is pulled low, activating the transmitter circuitry 18 and de-activating the receiver circuitry 16.

On the other hand, assuming the particular channel selected is in use, receiver audio on the line 162 is amplified by the audio amplifier 188, and the output of the rectifier and low pass filter circuit 190 is greater than the 2.5 volts at the comparator 222 non-inverting (+) input. Accordingly, the comparator 222 output goes low, removing the gate signal from the SCR 150. Thus, even though the PTT switch is operated, the relay coil 82 cannot be operated.

Sidetone audio during transmitting causes no particular problem because the SCR 150, once triggered into conduction, remains conducting, even though its gate drive is removed, first, by the side tone being amplified by the audio amplifier 189 and then, after the filter capacitor 188 has discharged, by the absence of a voltage supply to the triggering circuit 160.

It will be appreciated that the circuit of FIG. 3 requires minimal current during the receiving mode, and thus operating current can be drawn through the relay coil 82 without actuating the PTT relay 76. Tthe operational amplifier 200 and the comparator 222 require minimal operating current which, in any event, is limited by the series resistor 184 in the power supply circuit 178. The SCR 150 does not consume any current in the receive mode since the cathode 154 ground return is through the microphone PTT switch 54, which is normally open.

The final element in FIG. 3 is a bypass switch 234 to restore normal operation in the event the step-off device 120 fails. As depicted, the bypass switch is an SPDT switch which, in the "bypass" mode, connects the PTT line 87 directly to the microphone PTT switch 54.

While in no way intended to limit the scope of the claimed invention, in order to enable those skilled in the art to practice the invention without undue experimentation, the following table provides suitable values for the various components in the circuits of FIG. 1 and FIG. 3:

TABLE OF EXEMPLARY COMPONENT VALUES

Resistors
| | |
|---|---|
| 102, 232 | 10K Ohm |
| 107, 224 | 220K Ohm |
| 110 | 100K Ohm |
| 112 | 200K Ohm variable |
| 114 | 2.2K Ohm |
| 184 | 1K Ohm |
| 194 | 1K Ohm potentiometer |
| 202 | 1.5 MegOhm |
| 204 | 15K Ohm |
| 205, 206, 218 | 68K Ohm |
| 220 | 120K Ohm |
| 226 | 22K Ohm |
| 228 | 3.3K Ohm |

Capacitors
| | |
|---|---|
| 118, 208 | 10 mfd |
| 198 | 0.1 mfd |
| 210 | 0.33 mfd |
| 216 | 2.2 mfd |

Semiconductor Devices
| | |
|---|---|
| 88, 150 | Type No. DS87 SCR |
| 106, 200, 222 | Included in National Semiconductor Type No. LM392 integrated circuit. |
| 212, 214 | Type No. 1N60 Diodes |
| 230 | Silicon diode |

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention. For example, while shown specifically in the context of an aircraft voice communication radio, it will be appreciated that the embodiment of FIGS. 2 and 3 could be applied to other two-way radio communication systems as well.

What is claimed is:

1. A step-off device for retrofit connection to an aircraft voice communication radio of the type including radio receiver circuitry providing a received audio signal; radio transmitter circuitry; the radio receiver circuitry and the radio transmitter circuitry being selectively operable on any one of a plurality of predetermined radio frequency channels; and including ground connection-activated push-to-talk circuitry for manually activating the transmitter circuitry and deactivating the receiver circuitry; the push-to-talk circuitry in turn being of the type including a voltage supply line providing supply voltage with reference to a circuit reference node, a controlled switching element having an output portion operably connected for selectively activating the transmitter circuitry and deactivating the receiver circuitry and having a control input portion with a pair of input terminals for activating the output portion when at least a predetermined input current level flows through the input portion between the input terminals, a connection between one of the pair of switching element input terminals and the voltage supply line, and a push-to-talk control terminal connected to the other of the pair of switching element input terminals and arranged for connection to a manually-operable push-to-talk switch for completing a series electrical circuit to the circuit reference node for activating the controlled switching element; said step-off device comprising:
   a thyristor having a pair of main terminals and a gate terminal for triggering conduction between said main terminals, said thyristor main terminals being electrically interposed in series between the push-to-talk control terminal and the push-to-talk switch such that the transmitter circuitry can be activated only when said thyristor is conducting;
   a triggering circuit having an input connected to sense the received audio signal and having an output connected to said thyristor gate terminal, said triggering circuit operable to supply a gating signal to said thryistor gate terminal only when the received audio signal level is below a predetermined threshold level; and
   a power supply circuit for supplying operating voltage to said triggering circuit, said power supply circuit including a connection to the push-to-talk control terminal for deriving voltage from the voltage supply line through the control input portion of the controlled switching element during those periods of operation when the controlled switching element is not actuated, and including a series-connected current-limiting impedance for limiting current through said power supply circuit to a level below the predetermined input current level of the controlled switching element.

2. A step-off device in accordance with claim 1, wherein said triggering circuit comprises:
   a rectifier and low-pass filter circuit for providing at an output a DC voltage level representative of the received audio signal level at said triggering circuit input;
   a reference voltage source; and
   a voltage comparator having a comparison input connected to said output of said rectifier and low-pass filter circuit, a reference input connected to the reference voltage source, and an output serving as said triggering circuit output and connected to said thyristor gate terminal.

3. A step-off device in accordance with claim 2, wherein said triggering circuit further comprises an audio amplifier having an input connected to said triggering circuit input, and an output connected to said rectifier and low-pass filter circuit.

4. A step-off device in accordance with claim 1, which further comprises:
   an enclosure, said thyristor, said triggering circuit, and said power supply circuit being contained within said enclosure;
   a microphone receptacle carried by said enclosure and adapted for receiving a plug of a microphone of the type including a microphone element and a push-to-talk switch within a single housing, said microphone receptacle having at least a circuit reference connector terminal, a microphone audio circuit connector terminal, and a push-to-talk circuit connector terminal;
   a microphone circuit plug attached to said enclosure and adapted for connection to a microphone circuit receptacle of the radio, said microphone circuit plug having at least a circuit reference connector terminal, a microphone audio circuit connector terminal, and a push-to-talk circuit connector terminal;
   a sensing circuit connector attached to said enclosure and having at least a sensing circuit connector terminal adapted for connection to an audio output of the radio receiver;
   an electrical connection between said circuit reference connector terminal of said microphone receptacle and said circuit reference connector terminal of said microphone circuit plug;
   an electrical connection between said microphone audio circuit connector terminal of said microphone receptacle and said microphone audio circuit connector terminal of said microphone circuit plug;
   an electrical connection between said push-to-talk circuit connector terminal of said microphone receptacle and one of said thyristor main terminals, and an electrical connection between said push-to-talk circuit connector terminal of said microphone circuit plug and the other of said thyristor main terminals;
   an electrical connection between said push-to-talk circuit connector terminal of said microphone circuit plug and said power supply circuit; and
   an electrical connection between said sensing circuit connector terminal and said triggering circuit input.

5. A step-off device for retrofit connection to a voice communication radio of the type including radio receiver circuitry providing a received audio signal; radio transmitter circuitry; the radio receiver circuitry and the radio transmitter circuitry being selectively operable on any one of a plurality of predetermined radio frequency channels; and including ground connection-activated push-to-talk circuitry for manually activating the transmitter circuitry and deactivating the receiver circuitry; the push-to-talk circuitry in turn being of the type including a voltage supply line providing supply voltage with reference to a circuit reference node, a controlled switching element having an output portion operably connected for selectively activating the transmitter circuitry and deactivating the receiver circuitry and having a control input portion with a pair of input terminals for activating the output portion when at least a predetermined input current level flows through the input portion between the input terminals, a connection between one of the pair of switching element input terminals and the voltage supply line, and a push-to-talk control terminal connected to the other of the pair of switching element input terminals and arranged for connection to a manually-operable push-to-talk switch for completing a series electrical circuit to the circuit reference node for activating the controlled switching element; said step-off device comprising:
   a thyristor having a pair of main terminals and a gate terminal for triggering conduction between said main terminals, said thyristor main terminals being electrically interposed in series between the push-to-talk control terminal and the push-to-talk switch such that the transmitter circuitry can be activated only when said thyristor is conducting;
   a triggering circuit having an input connected to sense the received audio signal and having an output connected to said thyristor gate terminal, said triggering circuit operable to supply a gating signal to said thryistor gate terminal only when the received audio signal level is below a predetermined threshold level; and
   a power supply circuit for supplying operating voltage to said triggering circuit, said power supply circuit including a connection to the push-to-talk control terminal for deriving voltage from the voltage supply line through the control input portion of the controlled switching element during those periods of operation when the controlled switching element is not actuated, and including a series-connected current-limiting impedance for limiting current through said power supply circuit to a level below the predetermined input current level of the controlled switching element.

6. A step-off device in accordance with claim 5, wherein said triggering circuit comprises:
   a rectifier and low-pass filter circuit for providing at an output a DC voltage level representative of the received audio signal level at said triggering circuit input;
   a reference voltage source; and
   a voltage comparator having a comparison input connected to said output of said rectifier and low-pass filter circuit, a reference input connected to the reference voltage source, and an output serving as said triggering circuit output and connected to said thyristor gate terminal.

7. A step-off device in accordance with claim 6, wherein said triggering circuit further comprises an audio amplifier having an input connected to said triggering circuit input, and an output connected to said rectifier and low-pass filter circuit.

8. A step-off device in accordance with claim 5, which further comprises:
   an enclosure, said thyristor, said triggering circuit, and said power supply circuit being contained within said enclosure;
   a microphone receptacle carried by said enclosure and adapted for receiving a plug of a microphone of the type including a microphone element and a push-to-talk switch within a single housing, said microphone receptacle having at least a circuit reference connector terminal, a microphone audio circuit connector terminal, and a push-to-talk circuit connector terminal;
   a mirophone circuit plug attached to said enclosure and adapted for connection to a microphone circuit receptacle of the radio, said microphone circuit plug having at least a circuit reference connector terminal, a microphone audio circuit connector terminal, and a push-to-talk circuit connector terminal;

a sensing circuit connector attached to said enclosure and having at least a sensing circuit connector terminal adapted for connection to an audio output of the radio receiver;

an electrical connection between said circuit reference connector terminal of said microphone receptacle and said circuit reference connector terminal of said microphone circuit plug;

an electrical connection between said microphone audio circuit connector terminal of said microphone receptacle and said microphone audio circuit connector terminal of said microphone circuit plug;

an electrical connection between said push-to-talk circuit connector terminal of said microphone receptacle and one of said thyristor main terminals, and an electrical connection between said push-to-talk circuit connector terminal of said microphone circuit plug and the other of said thyristor main terminals;

an electrical connection between said push-to-talk circuit connector terminal of said microphone circuit plug and said power supply circuit; and an electrical connection between said sensing circuit connector terminal and said triggering circuit input.

* * * * *